United States Patent [19]

Koizumi

[11] Patent Number: 5,649,006
[45] Date of Patent: Jul. 15, 1997

[54] COMMUNICATION APPARATUS HAVING FUNCTION OF GENERATING CALLING SIGNAL

[75] Inventor: Shigeru Koizumi, Urawa, Japan

[73] Assignee: Canon Kabushiki Kaisha, Tokyo, Japan

[21] Appl. No.: 286,991

[22] Filed: Aug. 8, 1994

Related U.S. Application Data

[63] Continuation of Ser. No. 931,973, Aug. 19, 1992, abandoned.

[30] Foreign Application Priority Data

Aug. 22, 1991 [JP] Japan ................................ 3-235558

[51] Int. Cl.⁶ ........................ H04M 1/00; H04M 11/00
[52] U.S. Cl. ................. 379/373; 379/413; 379/100.16
[58] Field of Search ................................ 379/373, 418, 379/100, 252, 253, 254, 156, 399, 413; 358/442, 400

[56] References Cited

U.S. PATENT DOCUMENTS 3,940,572  2/1976  Burgess ................................ 379/156
4,421,953  12/1983  Zielinski ........................... 379/373 X
4,734,936  3/1988  Tanaka et al. ......................... 379/253
4,942,600  7/1990  Suzuki ................................. 379/100

FOREIGN PATENT DOCUMENTS 0165087  12/1985  European Pat. Off. .
2130849  6/1984  United Kingdom .
2148666  5/1985  United Kingdom .

OTHER PUBLICATIONS

Pat. Abs. Jp. vol. 9, No. 234, Sep. 20, 1985 (JP-A-60 89 159).

Primary Examiner—Krista M. Zele
Assistant Examiner—Jack Chiang
Attorney, Agent, or Firm—Fitzpatrick, Cella, Harper & Scinto

[57] ABSTRACT

A communication apparatus includes a DC power supplying unit for supplying a DC power to the apparatus, the DC power supplying unit containing a calling signal generating unit for generating a calling signal; a control unit for outputting a control signal to control said DC power supplying unit; and a conversion unit for electrically-isolating supplying the control signal outputted from said control unit to the calling signal generating unit.

7 Claims, 7 Drawing Sheets

COMMUNICATION APPARATUS HAVING FUNCTION OF GENERATING CALLING SIGNAL

This application is a continuation of application Ser. No. 07/931,973 filed Aug. 19, 1992 now abandoned.

BACKGROUND OF THE INVENTION

1. Field of the Invention

The present invention relates to a communication apparatus having function of generating a calling signal.

2. Related Background Art

Hitherto, there is known a facsimile apparatus having functions such as actuation of an automatic-answer/record phone and ringing of a telephone set.

According to such a facsimile apparatus, a calling signal generation circuit is arranged on a printed circuit board of an NCU (Network Control Unit) or an independent printed circuit board. A calling signal is sent from the circuit to perform an operation of actuation of the auto-answer/record phone and ringing of the telephone set as described above.

A conventional calling signal generation circuit employs a DC-DC converter system as a source voltage in order to obtain a high voltage (e.g., +24 V to −150 V) as calling signal. The circuit is so arranged that a boosted voltage obtained at the secondary end is controlled by a control signal from a main body circuit of the facsimile apparatus.

The conventional apparatus, however, has been associated with the following drawbacks, since the calling signal generation circuit having a DC—DC converter is incorporated in an NCU board, or arranged on an independent circuit board.

First, as mentioned above, since the calling signal is given with a high voltage (e.g., +24 V to —150 V), it is deemed on the safety standard as a dangerous voltage, and thus it is necessary for a secondary circuit of the DC—DC converter to be provided with a predetermined withstand voltage determined by the safety standard. However, in order to provide such a withstand voltage, it is obliged that an oscillation transformer of the DC-DC converter withstands a high voltage, and in addition, a control signal for controlling the calling signal is insulatingly supplied from the main body circuit to the calling signal generation circuit by using a photo-coupler or the like.

Second, while an oscillation frequency of the DC—DC converter is of the order of 10 KHz plus several KHz, its higher harmonic wave invades as a noise to other circuits. It is not easy to remove such a noise.

As to a calling signal generation circuit, there is known U.S. Pat. No. 4,942,600 (issued Jul. 17, 1990). As to a facsimile apparatus having a calling signal generation circuit, there are U.S. patent application Ser. Nos. 829,592 (filed Feb. 3, 1991) and 702,388 (filed May 20, 1991). However, there has been no proposal for removing the above-mentioned problems.

SUMMARY OF THE INVENTION

It is therefore an object of the present invention to provide an improved communication apparatus having function of generating a calling signal.

It is another object of the present invention to provide a communication apparatus capable of obtaining a source voltage for calling signal without using a DC—DC converter and also of facilitating increase of durability in voltage and anti-noise measures.

The objects and features of the present invention will become more apparent from the consideration of the following detailed description taken in conjunction with the accompanying drawings.

DESCRIPTION OF THE PREFERRED EMBODIMENTS

Preferred embodiments of the present invention will be described in detail with reference to the accompanying drawings.

Figure 1:
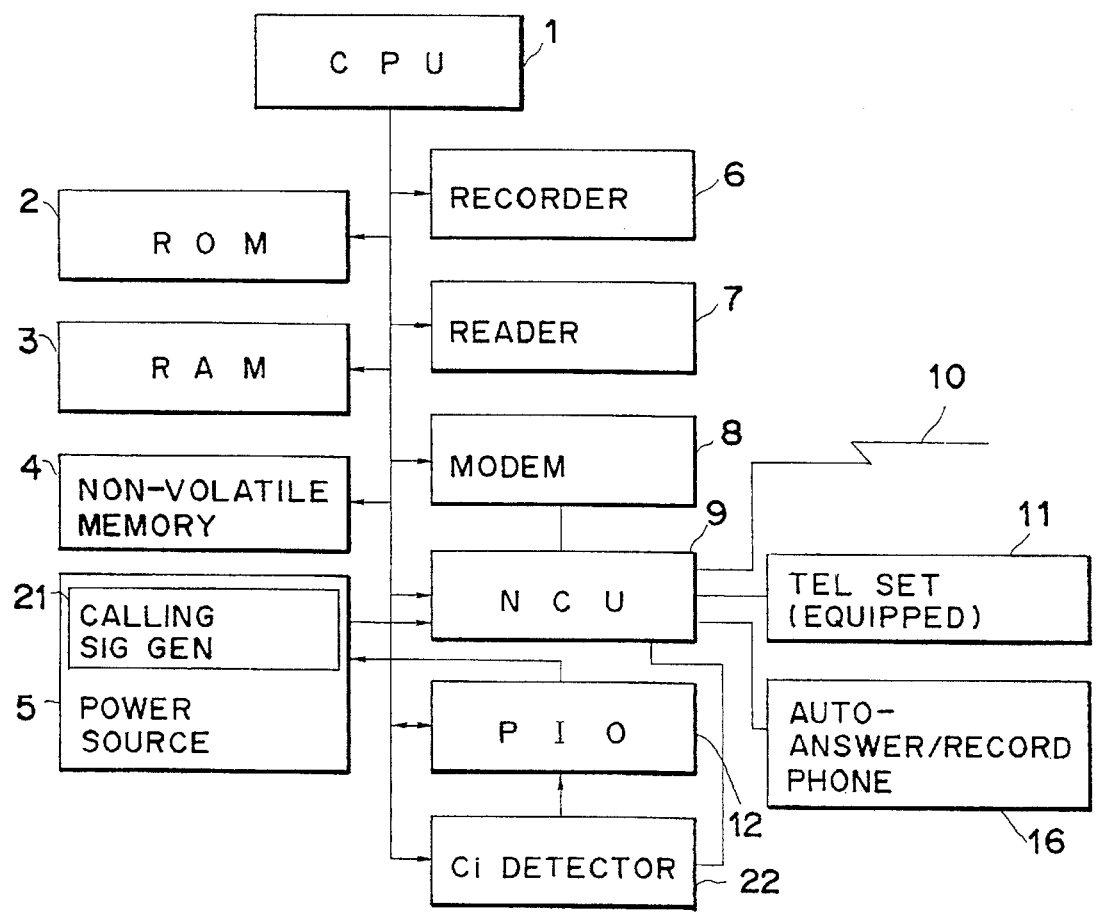
FIG. 1 is a block diagram showing an arrangement of a facsimile apparatus according to one embodiment of the present invention.

FIG. 1 is a block diagram showing an arrangement of a facsimile apparatus according to one embodiment of the present invention.

A CPU 1 is constituted of a microcomputer to control the facsimile apparatus in its entirety in accordance with a program stored in a ROM 2. A non-volatile memory 4 serves to store data to be saved even in a state that a power source 5 of the facsimile apparatus is turned off.

A recorder 6 serves to print out recording data taken out from a RAM 3 under control of the CPU 1, as a hard copy. A reader 7 serves to binarize the read data by using a CCD under control of the CPU 1 and then send sequentially the binary data to the RAM 3.

A modem section 8 is constituted of G3, G2, G1 and FM modems, a clock generating circuit connected to these modems and so on. The modem section 8 serves to modulate transmission data stored in the RAM 3 and then output the modulated data through an NCU (Network Control Unit) 9 to a telephone line 10, under control of the CPU 1. Further, the modem section 8 serves to receive an analog signal from the line 10 through the NCU 9, demodulate the same, and store the demodulated binary-encoded data in the RAM 3.

The NCU 9 serves, under control of the CPU 1, to selectively connect the line 10 with either the modem section 8, a telephone set (equipped in the facsimile apparatus) 11 or an automatic-answer/record phone 16.

The power source 5 is served as a main power source of the facsimile apparatus, and is so arranged that a DC output is obtained from a primary AC input. The power source 5 is also served as a power source for a calling signal for actuating the automatic answer/record phone 16 and ringing the telephone set (equipped) section 11.

A calling signal generation unit 21, which is built in the power source 5, outputs a quasi-calling signal (Ci signal) to the automatic-answer/record phone set 16. A Ci detector 22 detects a calling signal from the line 10.

Figure 2:
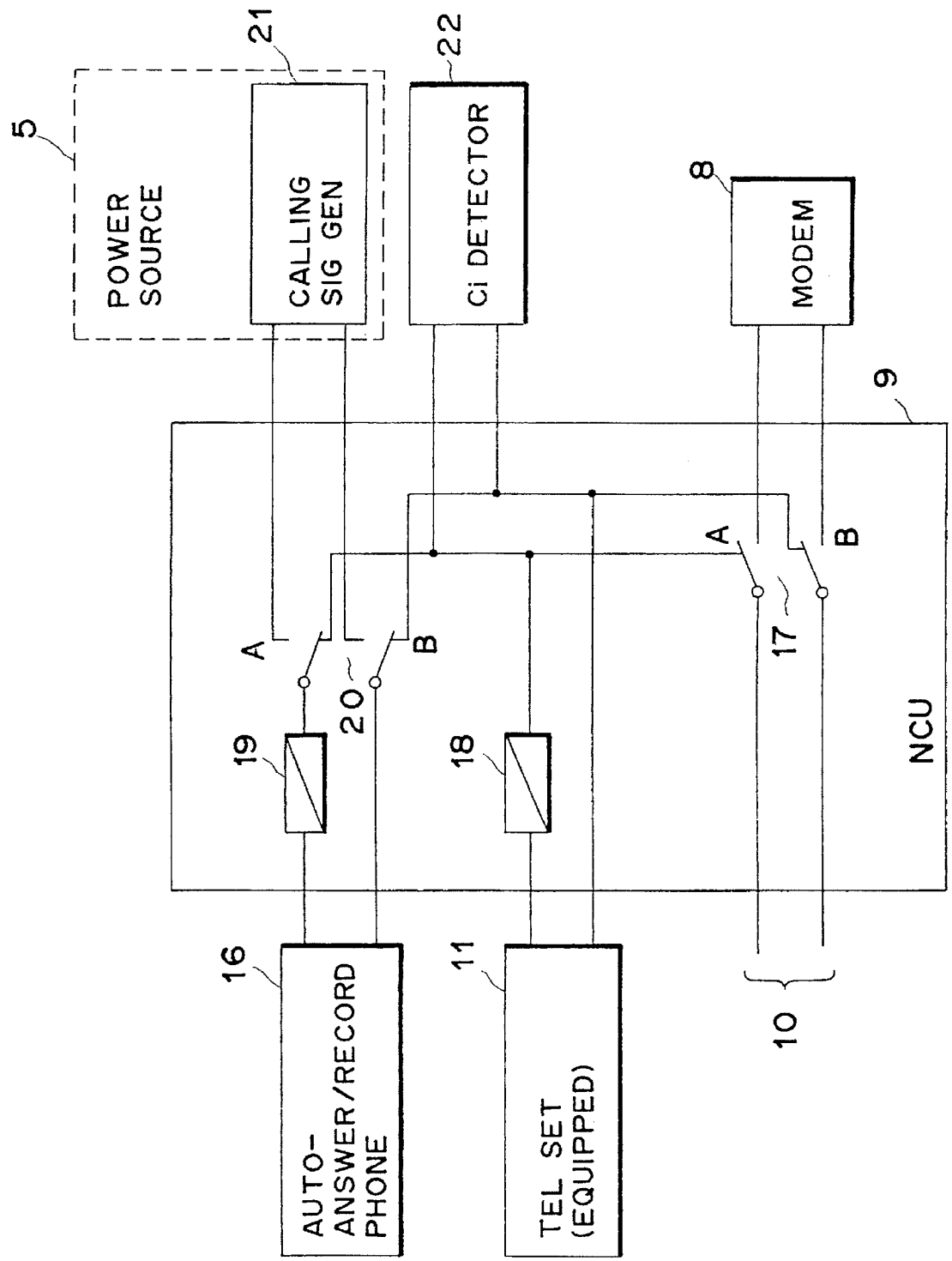
FIG. 2 is a block diagram showing an arrangement of an NCU section in the embodiment of the present invention.

FIG. 2 is a block diagram showing an arrangement of the NCU 9.

The NCU 9 comprises a CML relay 17 for selectively connecting the line 10 with a telephone side or a modem side, an off-hook detection circuit 18 for detecting a response of the telephone set 11, an off-hook detection circuit 19 for detecting a response of the automatic answer/record phone 16, and a K relay 20 for selectively connecting the automatic-answer/record phone 16 with the line 10 or the calling signal generation unit 21.

Figure 3:
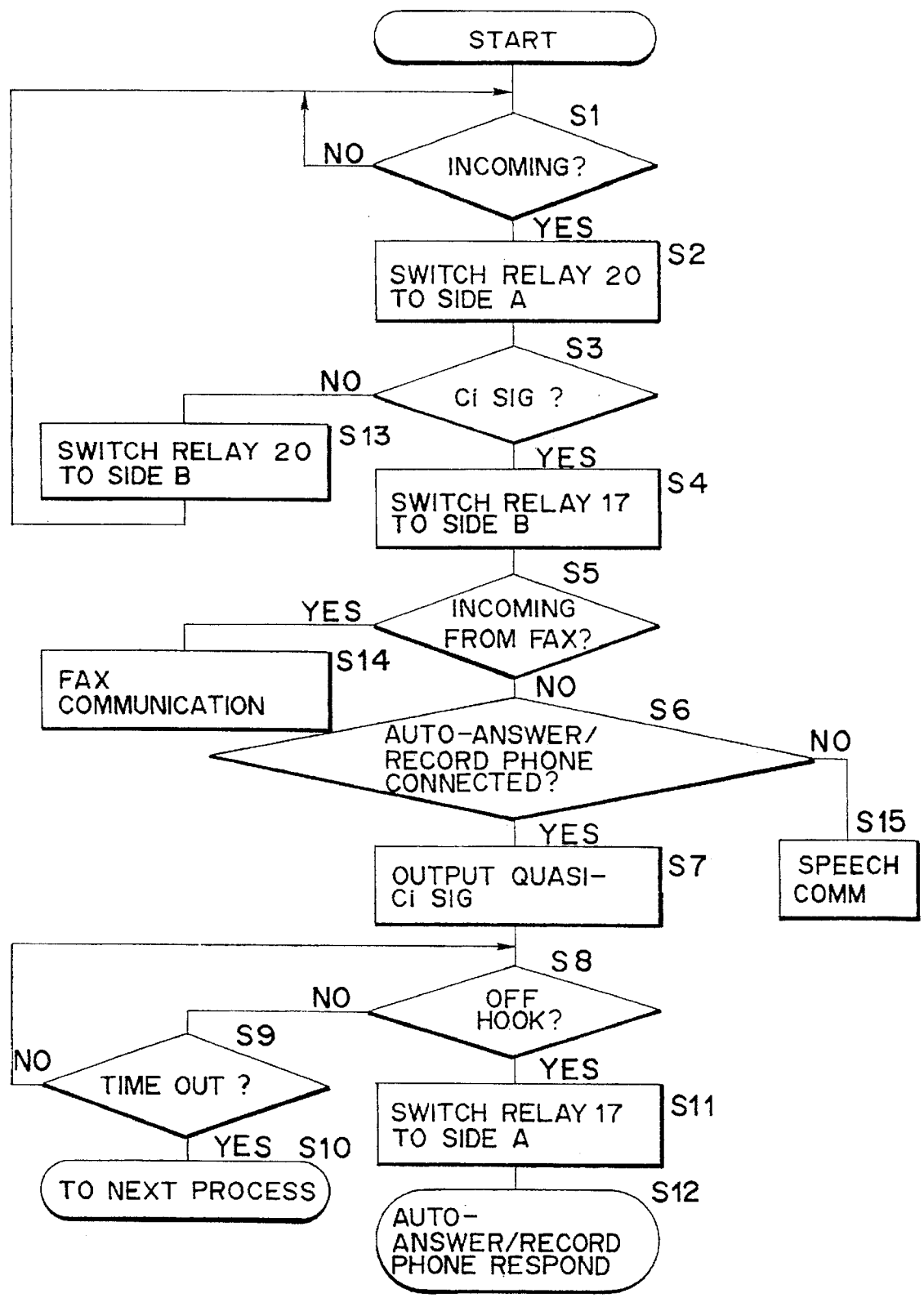
FIG. 3 is a flow chart showing operations of the embodiment of the present invention.

FIG. 3 is a flow chart showing operations at a call reception time in the instant embodiment.

First, it is previously registered in the non-volatile memory 4 by a software switch or the like that the automatic-answer/record phone 16 is equipped. Upon receiving an incoming call through the line 10 (step S1), the CPU 1 switches the K relay 20 to a side A (a side of the calling signal generation unit 21) (step S2) before the automatic-answer/record phone 16 responds to the incoming call, and the Ci detector 22 detects the Ci signal (step S3). If no Ci signal is detected, the K relay 20 is switched to a side B (a side of the line 10), and the flow is returned to await another incoming call (step S13).

On the other hand, in step S3, if the Ci signal is detected, the CML relay 17 is switched to a side B (a side of the modem 8) to seize the line 10 (step S4), and it is discriminated as to whether the incoming call is from a facsimile apparatus or it is from a telephone set (step S5). If the incoming is from the facsimile apparatus, the flow advances to facsimile communication (step S14). If the incoming is from the telephone set, the software switch is checked (step S6). If it is identified that the automatic-answer/record phone 16 is not connected, the flow advances to speech communication by the telephone set 11 (step S15). In the instant embodiment, the description as to the facsimile communication and the speech communication by the telephone set 11 will be omitted, and the description as to actuation operation of the automatic-answer/record phone 16 will be made.

In step S6, if the automatic-answer/record phone 16 is identified to be connected, the calling signal generation unit 21 outputs a quasi-calling signal having a frequency registered in the non-volatile memory 4 at a predetermined number of times or during a predetermined period of time, in order to activate the automatic-answer/record phone 16 (step S7).

A response of the automatic-answer/record phone 16 is monitored by a current relay of the off-hook detection circuit 19. If there is no response within a predetermined period of time T (step S9), the flow advances to the next process (step S10).

Figure 4:
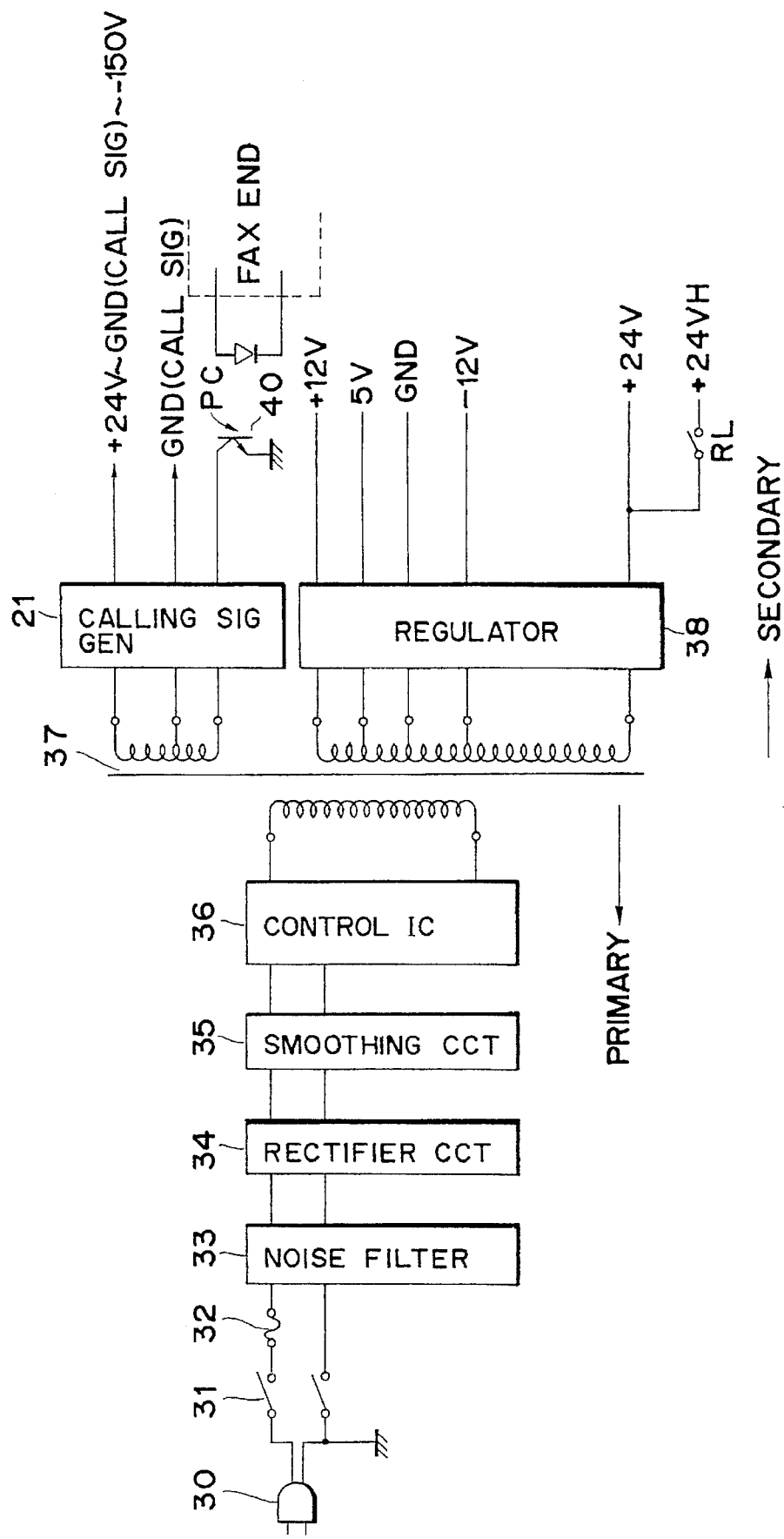
FIG. 4 is a block diagram showing an arrangement of a power source section in the embodiment of the present invention.

FIG. 4 is a block diagram showing an arrangement of the power source 5.

The power source 5 comprises an AC plug 30 for inputting an AC voltage, a source switch 31, a fuse 32, a noise filter 33, a rectifier circuit 34, a smoothing circuit 35, a source control unit 36 which includes an overvoltage detection circuit, an over-current protection circuit, a circuit for a PWM (Pulse Width Modulation) control of a switching power source and a shutdown circuit, a transformer 37, a regulator 38 for supplying a DC voltage to each of the circuits, a calling signal generation unit 21 for generating the quasi-calling signal by switching a voltage obtained from the transformer 37, and a photo-coupler 40 for entering a control signal for controlling a switching operation of the calling signal generation unit 21 through a circuit (CPU 1) on a main body of the facsimile apparatus to vary a frequency of the quasi-calling signal. The photo-coupler 40 serves to electrically separate the main body and the calling signal generation unit 21 from each other.

Figure 5:
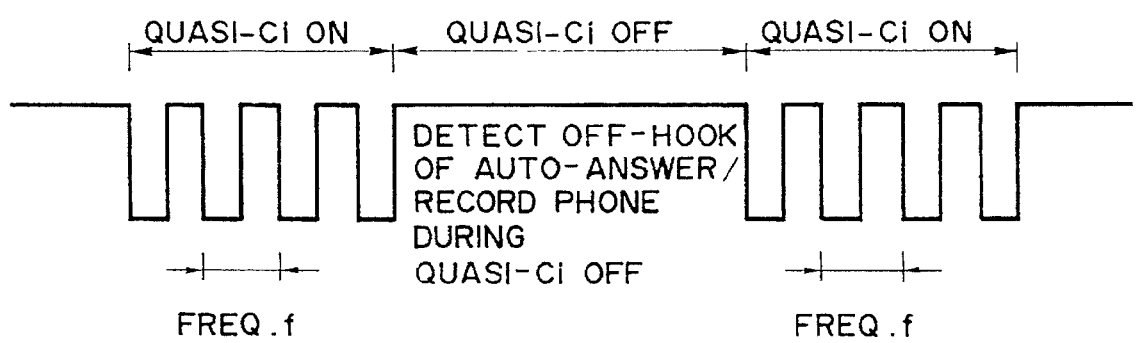
FIG. 5 is a time chart showing a timing of a quasi-calling signal in the embodiment of the present invention.

FIG. 5 is a time chart showing a timing of the quasi-calling signal.

The quasi-calling signal is of a square-wave of 24 V –GND—150 V. The CPU 1 turns on and off the photo-coupler 40 by pulse control of an output port of a parallel input-output unit (PIO) 12 for a control signal for controlling the quasi-calling signal. When the photo-coupler 40 is ON, the calling signal generation unit 21 outputs a voltage of –150 V at an output terminal thereof, and when the photo-coupler 40 is OFF, the calling signal generation unit 21 outputs a voltage of +24 V.

Figure 6:
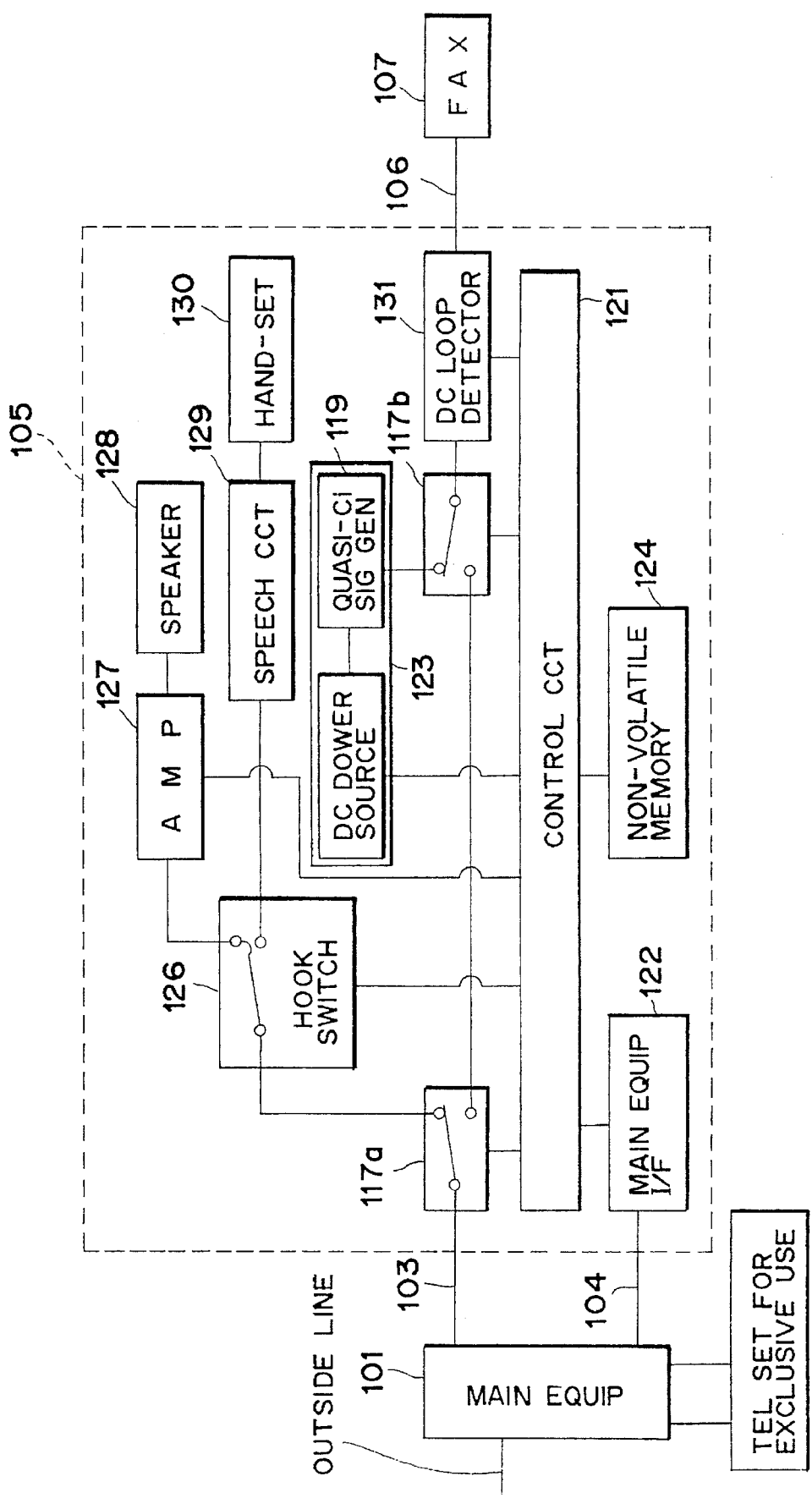
FIG. 6 is a block diagram showing an arrangement of a key-telephone system according to another embodiment of the present invention.

FIG. 6 is a block diagram showing an arrangement of a key-telephone system according to the second embodiment of the present invention.

In FIG. 6, a telephone set for exclusive use 105 is a four-wire key telephone set connected to a main equipment 101 via a speech channel 103 and a control line 104. The main equipment 101 is provided with a function of switching or exchanging a plurality of telephone sets for exclusive use.

A main equipment interface 122 of the telephone set for exclusive use 105 receives a control code such as a calling code from the main equipment 101, and transmits a control code such as an off-hook code to the main equipment 101.

On the other hand, the telephone set for exclusive use 105 is connected through a speech channel 106 to a two-wire facsimile machine 107, and serves as an adapter to connect the facsimile machine 107 to the main equipment 101. Relays 117a and 117b serve to connect the main equipment 101 and the facsimile machine 107 with each other.

A DC source circuit 123 of the telephone set for exclusive use 105 includes a built-in a quasi-signal generation unit 119. Further, the telephone set for exclusive use 105 has a control circuit 121, a non-volatile memory 124, a hook switch 126, an amplifier 127, a speaker 128, a speech channel 129, a handset 130, a DC loop detection circuit 131 and so on.

Figure 7:
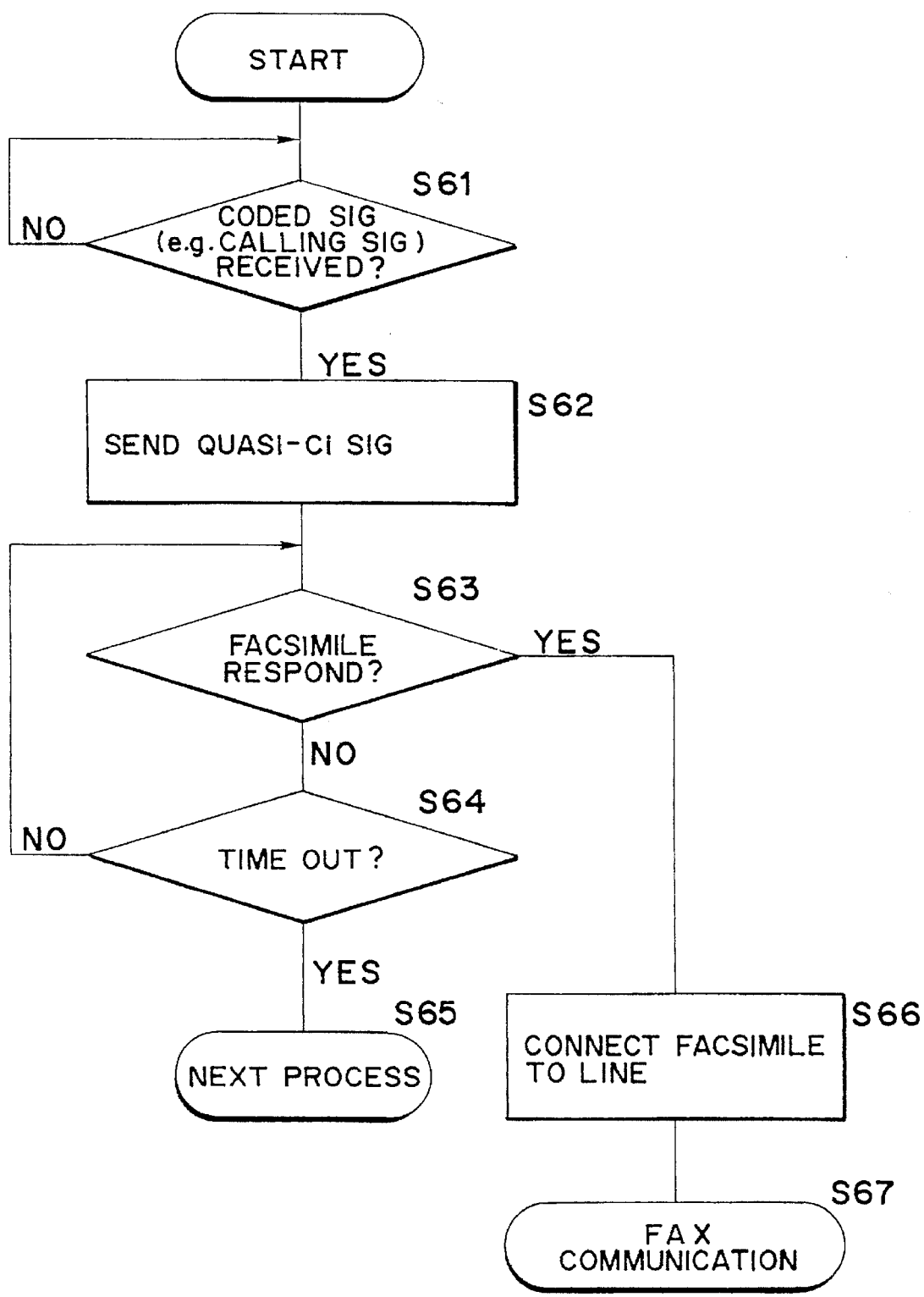
FIG. 7 is a flow chart useful for understanding operations of a telephone set for exclusive use.

FIG. 7 is a flow chart an operation of a telephone set for exclusive use 105.

In the step S61, when the main equipment interface 122 detects a calling code, the control circuit 121 supplies a square-wave having a frequency registered in the non-volatile memory 124, in the form of a control signal, to the quasi-calling signal generation unit 119 built in the DC source circuit 123, so as to generate a calling signal to send it via the speech channel 106 to the facsimile machine 107 (step S62).

A response of the facsimile machine 107 to the Ci signal is detected by a DC loop detection circuit 131 on the speech channel 106. If the facsimile machine 107 responds within a predetermined time (steps S63 and S64), the relays 117a and 117b are switched to connect the facsimile machine 107 to the speech channel 103 (step S66), and the flow advances to the facsimile communication (step S67). On the other hand, if there is no respond, the flow goes to a next process (step S65).

As described above, according to the present invention, there is no need to provide a DC—DC converter for use in exclusive as in the conventional apparatus, since the calling signal generation unit is built in the power source of the communication apparatus. Thus, it is possible to simplify the circuit structure, and also to facilitate increase of durability in voltage and anti-noise measures.

The present invention is not limited to the particular embodiments described above. Various changes and modifications may be made within the spirit and scope of the invention.

What is claimed is:

1. An image communication apparatus comprising:

image processing means for processing image data, said image processing means including circuits for communicating the image data and for outputting the image data;

DC power supplying means for supplying, to said image processing means, a DC power to drive said image processing means, said DC power supplying means including calling signal generating means for generating a calling signal having an ON period and an OFF period and regulator means for supplying, to said image processing means, a regulated DC power to drive said image processing means;

control means for outputting a control signal for controlling said DC power supplying means; and conversion means for electrically-isolatingly supplying the control signal outputted from said control means to said calling signal generating means.

2. An apparatus according to claim 1, wherein said conversion means includes a photo-coupler.

3. An apparatus according to claim 1, wherein said conversion means obtains a signal level of the calling signal by means of swing between a predetermined positive voltage value and a predetermined negative voltage value to cross over a zero voltage.

4. An image communication apparatus comprising:

an image processing unit for processing image data, said image processing unit including circuits for communicating the image data and for outputting the image data;

a DC power source unit for generating a DC voltage in accordance with an input AC voltage to supply, to said image processing unit, a DC power to drive said image processing unit, said DC power source unit including a transformer for transforming the input AC voltage, a calling signal generating unit for generating a calling signal having an ON period and an OFF period by switching a voltage obtained from said transformer and a regulator unit for supplying, to said image processing unit, a regulated DC voltage from said transformer to drive said image processing unit;

a control unit for outputting a control signal for controlling a switching operation of said calling signal generating unit; and a conversion unit for electrically-isolatingly supplying the control signal outputted from said control unit to said calling signal generating unit.

5. An apparatus according to claim 4, wherein said conversion circuit includes a photo-coupler.

6. An apparatus according to claim 1, wherein said DC power supply means comprises one transformer, and wherein the calling signal is formed in response to an output from a first secondary winding of said transformer.

7. An image communication apparatus comprising:

an image processing unit for processing image data, said image processing unit including circuits for communicating the image data and for outputting the image data;

a DC power source unit for generating a DC voltage in accordance with an input AC voltage to supply, to said image processing unit, a DC power to drive said image processing unit, said DC power source unit including a transformer for transforming the input AC voltage, a calling signal generating unit for generating a calling signal having an ON period and an OFF period by switching a voltage obtained from said transformer and a regulator unit for supplying, to said image processing unit, a regulated DC voltage from said transformer to drive said image processing unit;

a control unit for outputting a control signal for controlling a switching operation of said calling signal generating unit; and a conversion unit for electrically-isolatingly supplying the control signal outputted from said control unit to said calling signal generating unit, wherein said calling signal generating unit forms the calling signal in response to an output from a first secondary winding of said transformer, and said regulator unit forms the regulated DC voltage in response to an output from a second secondary winding of said transformer.

* * * * *

UNITED STATES PATENT AND TRADEMARK OFFICE
CERTIFICATE OF CORRECTION

PATENT NO. : 5,649,006

DATED : July 15, 1997

INVENTOR(S) : SHIGERU KOIZUMI

It is certified that error appears in the above-identified patent and that said Letters Patent is hereby corrected as shown below:

<u>COLUMN 4</u>

```
Line 7, "24 V" should read --+24 V--;
Line 37, "a" (second occurrence) should be deleted; and
Line 43, "chart" should read --chart of--.
```

Signed and Sealed this

Fourteenth Day of July, 1998

Attest:

BRUCE LEHMAN

Attesting Officer

Commissioner of Patents and Trademarks